US010887622B2

(12) United States Patent
Karczewicz et al.

(10) Patent No.: US 10,887,622 B2
(45) Date of Patent: Jan. 5, 2021

(54) DIVISION-FREE BILATERAL FILTER

(71) Applicant: QUALCOMM Incorporated, San Diego, CA (US)

(72) Inventors: Marta Karczewicz, San Diego, CA (US); Li Zhang, San Diego, CA (US); Wei-Jung Chien, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 182 days.

(21) Appl. No.: 16/027,173

(22) Filed: Jul. 3, 2018

(65) Prior Publication Data
US 2019/0014349 A1 Jan. 10, 2019

Related U.S. Application Data

(60) Provisional application No. 62/528,912, filed on Jul. 5, 2017.

(51) Int. Cl.
H04N 19/61 (2014.01)
H04N 19/176 (2014.01)
(Continued)

(52) U.S. Cl.
CPC ........ H04N 19/61 (2014.11); H04N 19/107 (2014.11); H04N 19/117 (2014.11); H04N 19/14 (2014.11);
(Continued)

(58) Field of Classification Search
CPC .... H04N 19/61; H04N 19/107; H04N 19/117; H04N 19/14; H04N 19/172; H04N 19/176; H04N 19/182; H04N 19/86
(Continued)

(56) References Cited

U.S. PATENT DOCUMENTS

2013/0003832 A1    1/2013  Li et al.
2013/0106837 A1*  5/2013  Mukherjee ........... H04N 13/122
                                                    345/419
(Continued)

FOREIGN PATENT DOCUMENTS

WO    2018067051 A1    4/2018
WO    2018149995 A1    8/2018

OTHER PUBLICATIONS

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

(Continued)

Primary Examiner — Jae N Noh
(74) Attorney, Agent, or Firm — Shumaker & Sieffert, P.A.

(57) ABSTRACT

A video decoder can be configured to perform a filtering operation by determining a first difference value that corresponds to a difference between the sample value of the selected sample and a sample value of a first neighboring sample; multiplying the first difference value by a first weighting parameter to determine a first weighted difference value; determining a second difference value that corresponds to a difference between the sample value of the selected sample and a sample value of a second neighboring sample; multiplying the second difference value by a second weighting parameter to determine a second weighted difference value; and adding the first weighted difference value and the second weighted difference value to the sample value of the selected sample to determine the modified sample value.

19 Claims, 10 Drawing Sheets

(51) Int. Cl.
H04N 19/172 (2014.01)
H04N 19/107 (2014.01)
H04N 19/117 (2014.01)
H04N 19/14 (2014.01)
H04N 19/86 (2014.01)
H04N 19/182 (2014.01)

(52) U.S. Cl.
CPC ......... *H04N 19/172* (2014.11); *H04N 19/176* (2014.11); *H04N 19/182* (2014.11); *H04N 19/86* (2014.11)

(58) Field of Classification Search
USPC .................................................. 375/240.02
See application file for complete search history.

(56) References Cited

U.S. PATENT DOCUMENTS

| | | | | |
|---|---|---|---|---|
| 2013/0156095 | A1* | 6/2013 | Li | H04N 21/233 375/240.02 |
| 2013/0322752 | A1 | 12/2013 | Lim et al. | |
| 2015/0063471 | A1* | 3/2015 | Zhu | G06F 3/1454 375/240.29 |
| 2016/0014176 | A1* | 1/2016 | Ariav | H04W 4/023 709/219 |
| 2016/0300328 | A1 | 10/2016 | Jiang | |
| 2018/0184127 | A1 | 6/2018 | Zhang et al. | |
| 2019/0037217 | A1 | 1/2019 | Jin et al. | |
| 2019/0082176 | A1 | 3/2019 | Zhang et al. | |
| 2019/0166363 | A1 | 5/2019 | Zhang et al. | |

OTHER PUBLICATIONS

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.
Bross B., et al., "High Efficiency Video Coding (HEVC) text specification draft 10 (for FDIS & Last Call)," Joint Collaborative Team on Video Coding (JCT-VC) of ITU-T SG16 WP3 and ISO/IEC JTC1/SC29/WG11 12th Meeting: Geneva, CH, Jan. 14-23, 2013, JCTVC-L1003_34, Mar. 19, 2013, 310 pp.
Fu C., et al., "Sample Adaptive Offset in the HEVC Standard," IEEE Transactions on Circuits and Systems for Video Technology, vol. 22, No. 12, Dec. 2012, pp. 1755-1764.
Karczewicz M., et al., "Improvements on adaptive loop filter," Joint Video Exploration Team (JVET) of ITU-T SG16 WP3 and ISO/IEC JTC1/SC29/WG11, 2nd Meeting: San Diego, USA, Feb. 20-26, 2016, JVET-B0060, 5 pp.
Karczewicz M., et al., "EE2.5: Improvements on adaptive loop filter," Joint Video Exploration Team (JVET) of ITU-T SG16 WP3 and ISO/IEC JTC1/SC29/WG11, 3rd Meeting: Geneva, CH, May 26-Jun. 1, 2016, JVET-00038, 4 pp.
Alshina E., et al., "Description of Exploration Experiments on Coding Tools," Joint Video Exploration Team (JVET) of ITU-T SG16 WP3 and ISO/IEC JTC1/SC29/WG11, 6th Meeting: Hobart, AU, Mar. 31-Apr. 7, 2017, JVET-F1011_r1, 8 pp.
Sullivan G., et al., "Overview of the High Efficiency Video Coding (HEVC) Standard," IEEE Transactions on Circuits and Systems for Video Technology, vol. 22, No. 12, Dec. 2012, pp. 1649-1668.
Norkin A., et al., "HEVC Deblocking Filter," IEEE Transactions on Circuits and Systems for Video Technology, vol. 22, No. 12, Dec. 2012, pp. 1746-1754.
Tomasi C., et al., "Bilateral Filtering for Gray and Color Images," in Proceedings of the IEEE International Conference on Computer Vision, 1998, pp. 839-846.
Strom J., et al., "Bilateral Filter After Inverse Transform," Joint Video Exploration Team (JVET) of ITU-T SG16 WP3 and ISO/IEC JTC1/SC29/WG11, 4th Meeting: Chengdu, CN, Oct. 15-21, 2016, JVET-D0069, 3 pp.
Strom J., et al., "Bilateral filter strength based on prediction mode," Joint Video Exploration Team (JVET) of ITU-T SG16 WP3 and ISO/IEC JTC1/SC29/WG11, 5th Meeting: Geneva, CH, Jan. 12-20, 2017, JVET-E0032, 3 pp.
Strom J., et al., "EE2-JVET related: Division-free bilateral filter," Joint Video Exploration Team (JVET) of ITU-T SG16 WP3 and ISO/IEC JTC1/SC29/WG11, 6th Meeting: Hobart, AU, Mar. 31-Apr. 7, 2017, JVET-F0096, 7 pp.
Wang Y., et al., "High Efficiency Video Coding (HEVC) Defect Report," Joint Collaborative Team on Video Coding (JCT-VC) of ITU-T SG16 WP3 and ISO/IEC JTC1/SC29/WG11, 14th Meeting: Vienna, AT, JCTVC-N1003_v1,Jul. 25-Aug. 2, 2013, 312 pp.
Chen J., et al., "Algorithm Description of Joint Exploration Test Model 1," Joint Video Exploration Team (JVET) of ITU-T SG16 WP3 and ISO/IEC JTC1/SC29/WG11, 1nd Meeting: Geneva, CH, Oct. 19-21, 2015, JVET-A1001, 27 pp.
Schwarz H., et al., "MPEG-4 anchors for the MPEG Call for Proposals on New Tools for Video Compression Technology," ITU-Telecommunications Standardization Sector, Study Group 16 Question 6, Video Coding Experts Group (VCEG), 13th Meeting: Austin, Texas, USA, Apr. 2-4, 2001, 8 pp.
Chen Y., et al., "Description of SDR, HDR and 360 video coding technology proposal by Qualcomm and Technicolor—low and high complexity versions", Joint Video Exploration Team (JVET) of ITU-T SG16 WP3 and ISO/IEC JTC1/SC29/WG11, 10th Meeting: San Diego, US, Apr. 10-20, 2018, JVET-J0021, 43 pp.
Alshina., et al., "Description of Exploration Experiments on Coding Tools," Joint Collaborative Team on Video Coding (JCT-VC)of ITU-T SG 16 WP 3 and ISO/IEC JTC 1/SC 29/WG 11, Doc. JVET-G1011_1r5, 7th Meeting; Torino, IT, Jul. 13-21, 2017, 8 pp.
Barash D., et al., "A common framework for nonlinear diffusion, adaptive smoothing, bilateral filtering and mean shift," Image and Vision Computing, vol. 22, No. 1, Jan. 1, 2004 (Jan. 1, 2004), pp. 73-81, XP055511340, Guildford, GB ISSN: 0262-8856, DOI: 10.1016/j.imavis.2003.08.005.
Bossen F., et al., "JVET Common Test Conditions and Software Reference Configurations for SDR video," 11th Meeting; Ljubljana, SI, Jul. 10-18, 2018, Joint Collaborative Team on Video Coding (JCT-VC) of ITU-T SG 16 WP 3 and ISO/IEC JTC 1/SC 29/WG 1, No. JVET-K1010_v2, 6 pp.
Chen J., et al., "Algorithm Description of Joint Exploration Test Model 7 (JEM 7)," 7th Meeting; Joint Collaborative Team on Video Coding (JCT-VC) of ITU-T SG 16 WP 3 and ISO/IEC JTC 1/SC 29/WG 11, No. JVET-G1001v1, Jul. 13-21, 2017, 50 pp.
Nadernejad E., et al., "Enhancing Perceived Quality of Compressed Images and Video with Anisotropic Diffusion and Fuzzy Filtering," Signal Processing, Image Communication, Elsevier Science Publishers, Amsterdam, NL, val. 28, No. 3, Dec. 16, 2012 (Dec. 16, 2012), pp. 222-240, XP028978848, ISSN: 0923-5965, DOI: 10.1016/J.IMAGE.2012.12.001.
Feng W-Q., et al., "A non-local bilateral filter for image denoising," Apperceiving Computing and Intelligence Analysis (ICACIA), 2010 International Conference on IEEE, Dec. 17, 2010 (Dec. 17, 2010), pp. 253-257, XP031901504,DOI: 10.1109/ICACIA.2010.5709895 ISBN: 978-1-4244-8025-8.
Gadde A., et al., "CE2.1.3: In-Loop Bilateral Filter," 11th Meeting; Ljubljana, SI; Jul. 10-18, 2018, Joint Collaborative Team on Video Coding (JCT-VC) of ITU-T SG 16 WP 3 and ISO/IEC JTC 1/SC 29/WG 1, No. JVET-K0384_v2, 4 pp.
International Search Report and Written Opinion—PCT/US2018/040933—ISA/EPO—dated Oct. 10, 2018.
Rusanovskyy D., et al., "CE14: Test on in-Loop Bilateral Filter from JVET-J0021/JVET-K0384 with parametrization (CE14.2)," 12 Meeting; Macao, CN; Oct. 3-12, 2018, Joint Collaborative Team on Video Coding (JCT-VC) of ITU-T SG 16 WP 3 and ISO/IEC JTC 1/SC 29/WG 1, No. JVET-L0406r1, 13 pp.
ZHANG D-Q., et al., "Recursive Bilateral Filter for Encoder-Integrated Video Denoising," Visual Communications and Image Processing (VCIP), 2012 IEEE, IEEE, Nov. 27, 2012 (Nov. 27, 2012), pp. 1-6, XP032309227, DOI: 10.1109/VCIP.2012.6410813, ISBN: 978-1-4673-4405-0.
Zhang L., et al., "Description of Core Experiment 14 (CE14): Post-reconstruction filtering," 11th Meeting; Ljubljana, SI, Jul.

(56) References Cited

OTHER PUBLICATIONS 10-18, 2018, Joint Collaborative Team on Video Coding (JCT-VC) of ITU-T SG 16 WP 3 and ISO/IEC JTC 1/SC 29/WG 1, No. JVET-K1034_v2, 6 pp.

Rusanovskyy, D., et al., "CE14.2-related: Extended applicability of bilateral filter (CE14.2c)", JVET-L0406r1 /JVET-L0584-v2, JVET of ITU-T SG 16 WP 3 and ISO/IEC JTC 1/SC 29/WG 11, 12th Meeting: Macao, CN, Oct. 3-12, 2018 (5 pp).

* cited by examiner

DIVISION-FREE BILATERAL FILTER

This application claims the benefit of U.S. Provisional Patent Application 62/528,912, filed 5 Jul. 2017, the entire content of which is hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the ITU-T H.265, High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure describes techniques related to bilateral filtering, and more specifically, this disclosure describes techniques that may reduce the computational complexity associated with bilateral filtering. As one example, this disclosure describes techniques for bilateral filtering that may reduce or eliminate the number of division operations and high-precision multiplication operations, when compared to existing implementations of bilateral filtering.

According to one example, a method of decoding video data includes determining sample values for samples of a block of video data; performing a filtering operation on a sample value of a selected sample of the block of the video data to generate a filtered block of video data comprising a modified sample value, wherein performing the filtering operation comprises determining a first difference value that corresponds to a difference between the sample value of the selected sample and a sample value of a first neighboring sample multiplying the first difference value by a first weighting parameter to determine a first weighted difference value; determining a second difference value that corresponds to a difference between the sample value of the selected sample and a sample value of a second neighboring sample; multiplying the second difference value by a second weighting parameter to determine a second weighted difference value; and adding the first weighted difference value and the second weighted difference value to the sample value of the selected sample to determine the modified sample value; and outputting the filtered block of video data.

According to another example, a device for decoding video data includes a memory configured to store the video data and one or more processors configured to determine sample values for samples of a block of the video data; perform a filtering operation on a sample value of a selected sample of the block of the video data to generate a filtered block of video data comprising a modified sample value, wherein to perform the filtering operation, the one or more processors are configured to determine a first difference value that corresponds to a difference between the sample value of the selected sample and a sample value of a first neighboring sample; multiply the first difference value by a first weighting parameter to determine a first weighted difference value; determine a second difference value that corresponds to a difference between the sample value of the selected sample and a sample value of a second neighboring sample; multiply the second difference value by a second weighting parameter to determine a second weighted difference value; and add the first weighted difference value and the second weighted difference value to the sample value of the selected sample to determine the modified sample value; and output the filtered block of video data.

According to another example, a computer-readable storage medium stores instructions that when executed by one or more processors cause the one or more processors to determine sample values for samples of a block of video data; perform a filtering operation on a sample value of a selected sample of the block of the video data to generate a filtered block of video data comprising a modified sample value, wherein to perform the filtering operation, the instructions cause the one or more processors to determine a first difference value that corresponds to a difference between the sample value of the selected sample and a sample value of a first neighboring sample; multiply the first difference value by a first weighting parameter to determine a first weighted difference value; determine a second difference value that corresponds to a difference between the sample value of the selected sample and a sample value of a second neighboring sample; multiply the second difference value by a second weighting parameter to determine a second weighted difference value; and add the first weighted difference value and the second weighted difference value to the sample value of the selected sample to determine the modified sample value; and output the filtered block of video data.

According to another example, a device for decoding video data includes means for determining sample values for samples of a block of video data; means for performing a filtering operation on a sample value of a selected sample of the block of the video data to generate a filtered block of video data comprising a modified sample value, wherein the means for performing the filtering operation comprises means for determining a first difference value that corresponds to a difference between the sample value of the selected sample and a sample value of a first neighboring sample; means for multiplying the first difference value by a first weighting parameter to determine a first weighted difference value; means for determining a second difference value that corresponds to a difference between the sample value of the selected sample and a sample value of a second neighboring sample; means for multiplying the second difference value by a second weighting parameter to determine a second weighted difference value; and means for adding the first weighted difference value and the second weighted difference value to the sample value of the selected sample to determine the modified sample value; and means for outputting the filtered block of video data.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIGS. 3A-3D show four 1-D directional patterns for edge offset (EO) sample classification.

DETAILED DESCRIPTION

Figure 1:
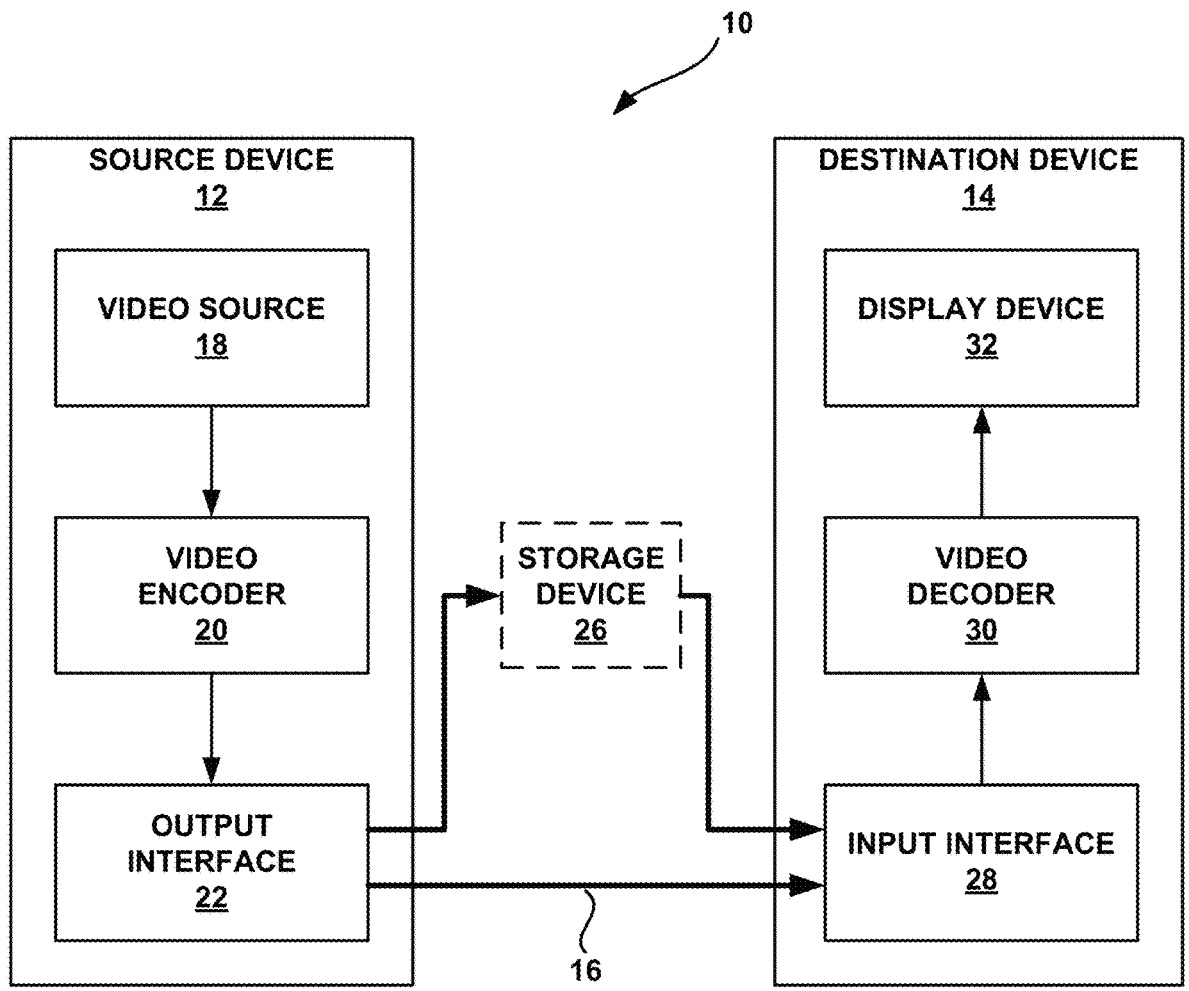
FIG. 1 is a block diagram illustrating an example video encoding and decoding system that may utilize the techniques described in this disclosure.

Video coding (e.g., video encoding or video decoding) typically involves predicting a block of video data using a prediction mode. Two common prediction modes involve predicting blocks from either an already coded block of video data in the same picture (i.e. an intra prediction mode) or an already coded block of video data in a different picture (i.e. an inter prediction mode). Other prediction modes, such as an intra block copy mode, a palette mode, or a dictionary mode, may also be used. In some instances, the video encoder also calculates residual data by comparing the predictive block to the original block. Thus, the residual data represents a difference between the predictive block and the original block. The video encoder transforms and quantizes the residual data and signals the transformed and quantized residual data in the encoded bitstream.

A video decoder dequantizes and inverse transforms the received residual data to determine the residual data calculated by the video encoder. As transformation and quantization can be lossy processes, the residual data determined by the video decoder may not exactly match the residual data calculated by the encoder. A video decoder adds the residual data to the predictive block to produce a reconstructed video block that matches the original video block more closely than the predictive block alone. To further improve the quality of decoded video, a video decoder can perform one or more filtering operations on the reconstructed video blocks. The High Efficiency Video Coding (HEVC) standard, for example, utilizes deblocking filtering and sample adaptive offset (SAO) filtering. Other types of filtering such as adaptive loop filtering (ALF) may also be used. Parameters for these filtering operations may either be determined by a video encoder and explicitly signaled in the encoded video bitstream or may be implicitly determined by a video decoder without needing the parameters to be explicitly signaled in the encoded video bitstream.

Another type of filtering proposed for inclusion in future generation video coding standards is bilateral filtering. In bilateral filtering, weights are assigned to neighboring samples of a current sample and the current sample, based on the weights, the values of the neighboring samples, and the value of the current sample, may be modified, i.e., filtered. Although bilateral filtering may be applied with other filters in any combination or permutation, bilateral filtering is typically applied right after the reconstruction of one block, such that the filtered block may be used for coding/decoding following blocks. That is, the bilateral filter may be applied to a block of video data before deblock filtering is applied to the block. In other examples, bilateral filtering may be applied right after reconstruction of a block and before coding following blocks, or right before deblocking filter, or after deblocking filter, or after SAO or after ALF.

Deblocking filtering smooths the transitions around the edges of blocks to avoid decoded video having a blocky look. Bilateral filtering typically does not filter across block boundaries, but instead, only filters samples within a block. The bilateral filter may, for example, improve overall video coding quality by helping to avoid undesirable over-smoothing caused by deblocking filtering in some coding scenarios.

This disclosure describes techniques related to bilateral filtering, and more specifically, this disclosure describes techniques that may reduce the computational complexity associated with bilateral filtering. As one example, this disclosure describes techniques for bilateral filtering that may reduce or eliminate the number of division operations and high-precision multiplication operations, when compared to existing implementations of bilateral filtering.

As used in this disclosure, the term video coding generically refers to either video encoding or video decoding. Similarly, the term video coder may generically refer to a video encoder or a video decoder. Moreover, certain techniques described in this disclosure with respect to video decoding may also apply to video encoding, and vice versa. For example, often times video encoders and video decoders are configured to perform the same process, or reciprocal processes. Also, video encoders typically perform video decoding as part of the processes of determining how to encode video data. Therefore, unless explicitly stated to the contrary, it should not be assumed that a technique described with respect to video decoding cannot also be performed by a video encoder, or vice versa.

This disclosure may also use terms such as current layer, current block, current picture, current slice, etc. In the context of this disclosure, the term current is intended to identify a block, picture, slice, etc. that is currently being coded, as opposed to, for example, previously or already coded blocks, pictures, and slices or yet to be coded blocks, pictures, and slices.

FIG. 1 is a block diagram illustrating an example video encoding and decoding system 10 that may utilize the bi-lateral filtering techniques described in this disclosure. As shown in FIG. 1, system 10 includes a source device 12 that generates encoded video data to be decoded at a later time by a destination device 14. Source device 12 and destination device 14 may be any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, head mounted display (HMD) devices, or the like. In some cases, source device 12 and destination device 14 may be equipped for wireless communication.

Destination device 14 may receive the encoded video data to be decoded via a link 16. Link 16 may be any type of medium or device capable of moving the encoded video data from source device 12 to destination device 14. In one example, link 16 may be a communication medium to enable source device 12 to transmit encoded video data directly to destination device 14 in real-time. The encoded video data may be modulated according to a communication standard, such as a wireless communication protocol, and transmitted to destination device 14. The communication medium may be any one of or combination of wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In another example, encoded data may be output from output interface 22 to a storage device 26. Similarly, encoded data may be accessed from storage device 26 by input interface. Storage device 26 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 26 may correspond to a file server or another intermediate storage device that may hold the encoded video generated by source device 12. Destination device 14 may access stored video data from storage device 26 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 26 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 26 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 26, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may be any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard and may conform to the HEVC Test Model (HM). Video encoder 20 and video decoder 30 may additionally operate according to an HEVC extension, such as the range extension, the multiview extension (MV-HEVC), or the scalable extension (SHVC) which have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

Video encoder 20 and video decoder 30 may also operate according to other proprietary or industry standards, such as the ITU-T H.264 standard, alternatively referred to as ISO/IEC MPEG-4, Part 10, Advanced Video Coding (AVC), or extensions of such standards, such as the Scalable Video Coding (SVC) and Multi-view Video Coding (MVC) extensions. The techniques of this disclosure, however, are not limited to any particular coding standard. Other examples of video compression standards include ITU-T H.261, ISO/IEC MPEG-1 Visual, ITU-T H.262 or ISO/IEC MPEG-2 Visual, ITU-T H.263, and ISO/IEC MPEG-4 Visual.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (WET) to evaluate compression technology designs proposed by their experts in this area. The JVET first met during 19-21 Oct. 2015. One version of reference software, i.e., Joint Exploration Model 6 (JEM 6) can be downloaded from: https://jvet.hhi.fraunhofer.de/svn/svn_HMJEMSoftware/tags/HM-16.6-JEM-6.0/. An algorithm description for JEM 6 is also described in JVET-F1011.

Techniques of this disclosure may utilize HEVC terminology for ease of explanation. It should not be assumed, however, that the techniques of this disclosure are limited to HEVC, and in fact, it is explicitly contemplated that the techniques of this disclosure may be implemented in successor standards to HEVC and its extensions. It is contemplated, for example, that the techniques described herein may be used with the H.266 standard presently under develop, and extensions thereof.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transistory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In HEVC and other video coding specifications, a video sequence typically includes a series of pictures. Pictures may also be referred to as "frames." In one example approach, a picture may include three sample arrays, denoted $S_L$, $S_{Cb}$, and $S_{Cr}$. In such an example approach, $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may include a coding tree block of luma samples, two corresponding coding tree blocks of chroma samples, and syntax structures used to code the samples of the coding tree blocks. In monochrome pictures or pictures having three separate color planes, a CTU may include a single coding tree block and syntax structures used to code the samples of the coding tree block. A coding tree block may be an NxN block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quadtree partitioning on the coding tree blocks of a CTU to divide the coding tree blocks into coding blocks, hence the name "coding tree units." A coding block may be an NxN block of samples. A CU may include a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may include a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may include a prediction block of luma samples, two corresponding prediction blocks of chroma samples, and syntax structures used to predict the prediction blocks. In monochrome pictures or pictures having three separate color planes, a PU may include a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU' s original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quadtree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may include a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may include a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

The above block structure with CTUs, CUs, PUs, and TUs generally describes the block structure used in HEVC. Other video coding standards, however, may use different block structures. As one example, although HEVC allows PUs and TUs to have different sizes or shapes, other video coding standards may require predictive blocks and transform blocks to have a same size. The techniques of this disclosure are not limited to the block structure of HEVC and may be compatible with other block structures. As an example of an alternative block structure, JEM utilizes a quadtree-binary tree (QTBT) structure. The QTBT structure of JEM removes the concepts of multiple partition types, such as the separation between CUs, PUs, and TUs of HEVC. A QTBT structure of JEM includes two levels: a first level partitioned according to quadtree partitioning, and a second level partitioned according to binary tree partitioning. A root node of the QTBT structure corresponds to a CTU. Leaf nodes of the binary trees correspond to CUs.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may include a sequence of Network Abstraction Layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a PPS, a second type of NAL unit may encapsulate an RBSP for a coded slice, a third type of NAL unit may encapsulate an RBSP for SEI messages, and so on. NAL units that encapsulate RBSPs for video coding data (as opposed to RBSPs for parameter sets and SEI messages) may be referred to as VCL NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

As introduced above, HEVC utilizes a quadtree structure for partitioning blocks. In HEVC, the largest coding unit in a slice is called a coding tree block (CTB), also referred to as a CTU. A CTB contains a quadtree of nodes of which are CUs. The blocks specified as luma and chroma CTBs can be directly used as CUs or can be further partitioned into multiple CUs. Partitioning is achieved using tree structures. The tree partitioning in HEVC is generally applied simultaneously to both luma and chroma, although exceptions apply when certain minimum sizes are reached for chroma.

The CTU contains a quadtree syntax that allows for splitting the CUs to a selected appropriate size based on the signal characteristics of the region that is covered by the CTB. The quadtree splitting process can be iterated until the size for a luma CB reaches a minimum allowed luma CB size that is selected by the encoder using syntax in the SPS and is always 8×8 or larger (in units of luma samples). An example of splitting one CTU into multiple CBs are depicted in FIGS. 2A and 2B.

The boundaries of the picture are defined in units of the minimum allowed luma CB size. As a result, at the right and bottom edges of the picture, some CTUs may cover regions that are partly outside the boundaries of the picture. This condition is detected by the decoder, and the CTU quadtree is implicitly split as necessary to reduce the CB size to the point where the entire CB fits into the picture.

Figure 2A:
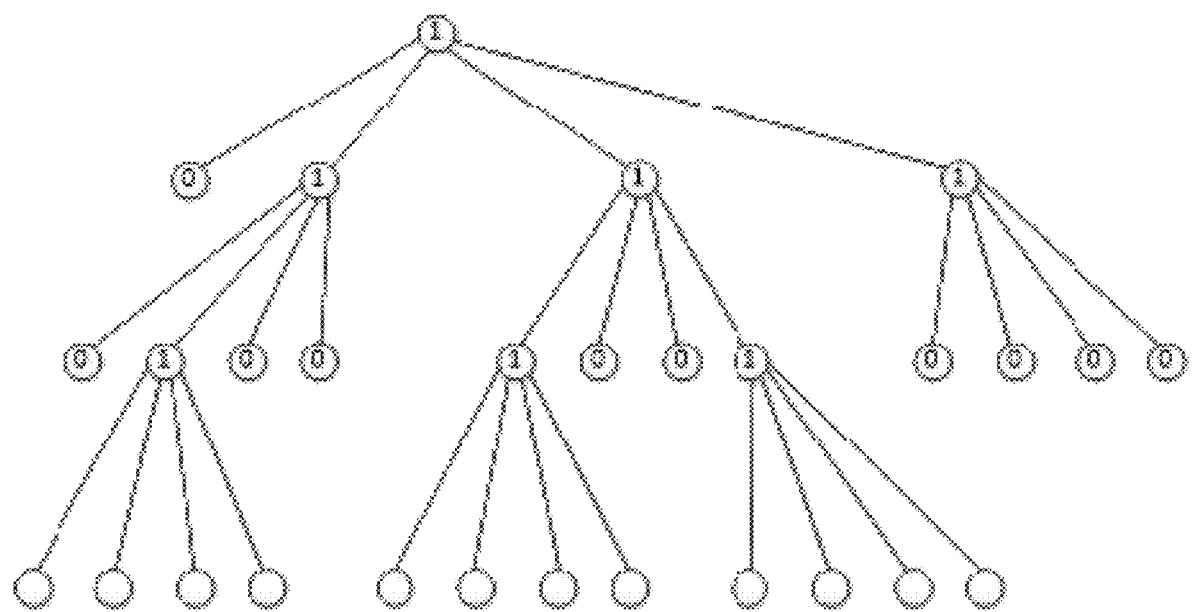
FIG. 2A shows an example of CTU-to-CU partitioning in HEVC.
Figure 2B:
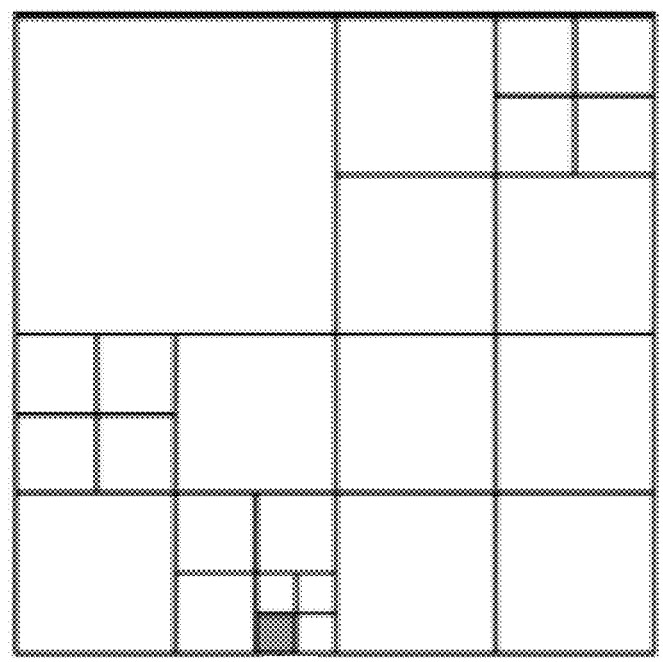
FIG. 2B shows the corresponding quadtree representation of FIG. 2A.

FIG. 2A shows an example of CTU-to-CU partitioning in HEVC, and FIG. 2B shows the corresponding quadtree representation. Video encoder 20 and video decoder 30 may, for example, be configured to perform the CTU-to-CU partitioning shown in FIGS. 2A and 2B. Aspects of quadtree partitioning are described in more detail in G. J. Sullivan; J.-R. Ohm; W.-J. Han; T. Wiegand (December 2012), "Overview of the High Efficiency Video Coding (HEVC) Standard," IEEE Transactions on Circuits and Systems for Video Technology (IEEE) 22 (12). Note that no signaling is required when the leaf nodes correspond to 8×8 CUs.

HEVC employs two in-loop filters, referred to as a de-blocking filter and an SAO filter. HEVC utilizes deblock filtering to reduce blockiness around block boundaries. The input to this coding tool is the reconstructed image after intra or inter prediction. The deblocking filter performs detection of the artifacts at the coded block boundaries and attenuates them by applying a selected filter. Compared to the H.264/AVC deblocking filter, the HEVC deblocking filter has lower computational complexity and better parallel processing capabilities while still achieving significant reduction of the visual artifacts. Aspects of deblocking filtering in HEVC are described in A. Norkin, G. Bjontegaard, A. Fuldseth, M. Narroschke, M. Ikeda, K. Andersson, Minhua Zhou, G. Van der Auwera, "HEVC Deblocking Filter," IEEE Trans. Circuits Syst. Video Technol., 22(12): 1746-1754 (2012).

HEVC also utilizes SAO filtering, which is a type of filtering where offsets are added to sample values (e.g., post deblocked sample values) to potentially improve the quality of decoded video. The input to SAO, in HEVC, is the reconstructed image after invoking deblocking filtering. The general concept of SAO is to reduce mean sample distortion of a region by first classifying the region samples into multiple categories with a selected classifier, obtaining an offset for each category, and then adding the offset to each sample of the category, where the classifier index and the offsets of the region are coded in the bitstream. In HEVC, the region (the unit for SAO parameters signaling) is defined to be a CTU.

HEVC utilizes two different types of SAO filtering, both of which can satisfy the requirements of low complexity. The two types of SAO utilized in HEVC are edge offset (EO) and band offset (BO). When implementing SAO filtering, video decoder 30 may, for example, receive an index (in the range of 0 to 2) indicating the type of SAO used or indicating that neither type of SAO is used.

Figures 3A, 3B, 3C, 3D:
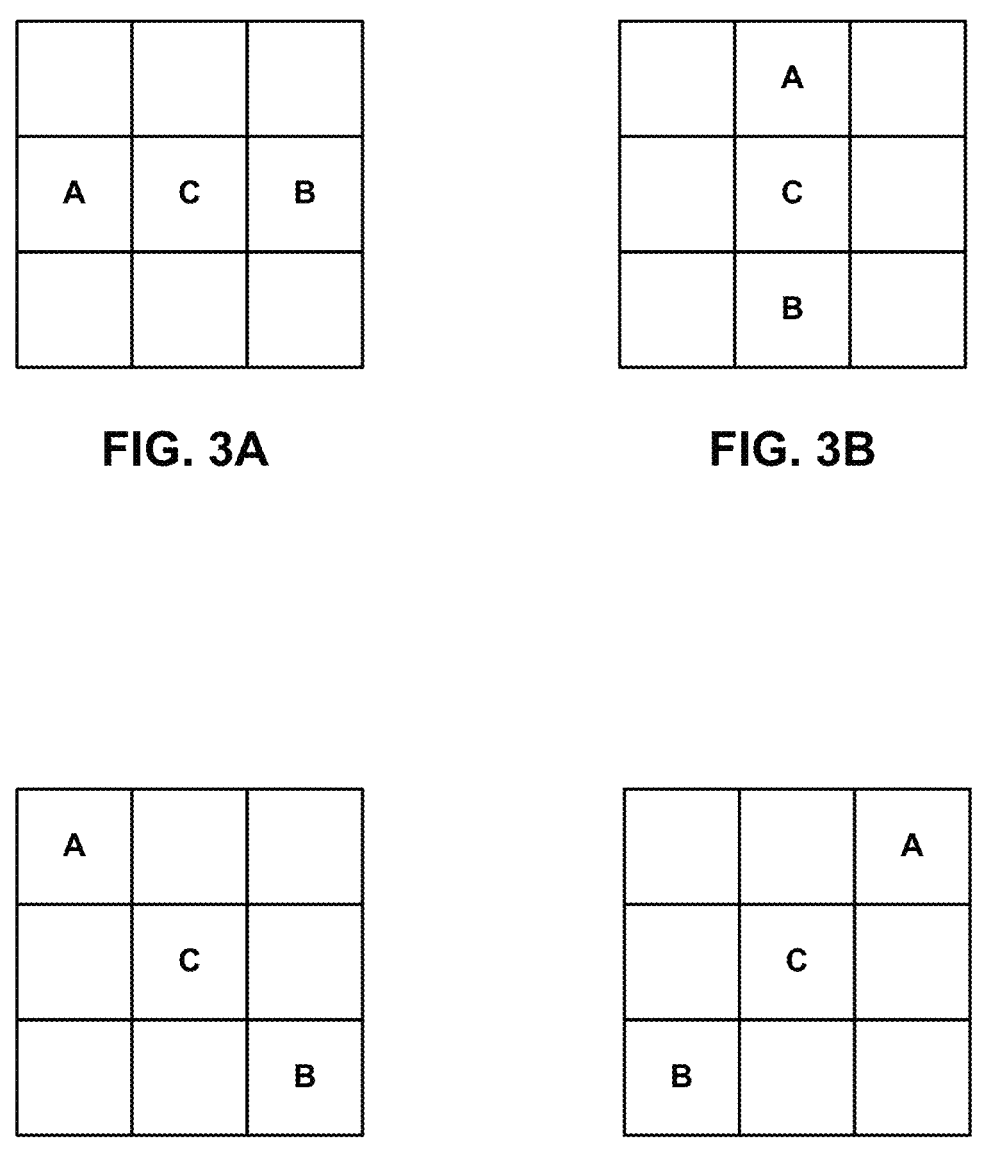

When performing EO, video encoder 20 and video decoder 30 may use a sample classification based on a comparison of a current samples to neighboring samples according to a 1-D directional pattern. FIGS. 3A-3D show examples of 1-D directional patterns used for different EO sample classification. In the examples of FIGS. 3A-3D, video decoder 30 compares sample C to samples A and B to determine a category for sample C, as described in more detail below with respect to Table I. FIG. 3A shows an example of the samples used for a horizontal classification (EO class=0). FIG. 3B shows an example of the samples used for a vertical classification (EO class=1). FIG. 3C shows an example of the samples used for a 135° diagonal classification (EO class=2). FIG. 3D shows an example of the samples used for a 45° diagonal classification (EO class=3).

According to the selected EO pattern, HEVC defines five categories, denoted by edgeIdx in Table I. For edgeIdx equal to 0~3, the magnitude of an offset may be signaled while the sign flag is implicitly coded, i.e., negative offset for edgeIdx equal to 0 or 1 and positive offset for edgeIdx equal to 2 or 3. For edgeIdx equal to 4, the offset is always set to 0 which means no operation is required for this case. Thus, when filtering a sample, if the sample meets the condition of category 0, then video decoder 30 adds an offset associated with category 0 to the sample, and if the sample meets the condition of category 1, then video decoder adds an offset associated with category 1 to the sample, and so on. If the sample does not meet the condition of any of category 1-4, then video decoder 30 does not add an offset to the sample.

TABLE I classification for EO

| Category (edgeIdx) | Condition |
|---|---|
| 0 | c < a && c < b |
| 1 | (c < a && c == b) \|\| (c == a && c < b) |
| 2 | (c > a && c == b) \|\| (c == a && c > b) |
| 3 | c > a && c > b |
| 4 | None of the above |

For BO, video decoder 30 performs sample classification based on sample values. Each color component may have its own SAO parameters. BO implies one offset is added to all samples of the same band. The sample value range is equally divided into 32 bands. For 8-bit samples ranging from 0 to 255, the width of a band is 8, and sample values from 8k to 8k+7 belong to band k, where k ranges from 0 to 31. The average difference between the original samples and reconstructed samples in a band (i.e., offset of a band) is signaled to the decoder. There is no constraint on offset signs. Only offsets of four consecutive bands and the starting band position are signaled to the decoder. All remaining bands are associated with an offset of 0.

To reduce the signaling overhead associated with signaling side information (e.g., offset types and offset values), multiple CTUs may be merged together, either copying the parameters from above CTU (through setting sao_merge_left_flag equal to 1) or left CTU (through setting sao_merge_up_flag equal to 1) to share SAO parameters.

In addition to the modified deblock filtering and SAO of HEVC, JEM has included another filtering method, called Geometry transformation-based Adaptive Loop Filtering (GALF). GALF aims to improve the coding efficiency of adaptive loop filtering (ALF). ALF was considered for inclusion in HEVC but ultimately was not included in the final version of HEVC. ALF aims to minimize the mean square error between original samples and decoded samples by using Wiener-based adaptive filtering. If performing ALF, video decoder 30 classifies samples in a picture into multiple categories and filters the samples in each category using an adaptive filter associated with the category. The filter coefficients may be signaled or inherited to optimize the trade-off between the mean square error and the overhead. GALF was proposed to further improve the performance of ALF by introducing geometric transformations, such as rotation, diagonal and vertical flip to be applied to the samples in filter support regions depending on the orientation of the gradient of the reconstructed samples before ALF. The input to ALF/GALF is the reconstructed image after invoking SAO.

In M. Karczewicz, L. Zhang, W.-J. Chien, X. Li, "EE2.5: Improvements on adaptive loop filter," Exploration Team (JVET) of ITU-T SG 16 WP 3 and ISO/IEC JTC 1/SC 29/WG 11, Doc. JVET-B0060, 2$^{nd}$ Meeting: San Diego, USA, 20 Feb.-26 Feb. 2016 and M. Karczewicz, L. Zhang, W.-J. Chien, X. Li, "EE2.5: Improvements on adaptive loop filter," Exploration Team (JVET) of ITU-T SG 16 WP 3 and ISO/IEC JTC 1/SC 29/WG 11, Doc. JVET-00038, 3$^{rd}$ Meeting: Geneva, CH, 26 May-1 Jun. 2016, GALF was proposed and adopted into JEM 3.0. In GALF, the classification is modified with the diagonal gradients taken into consideration and geometric transformations could be applied to filter coefficients. If performing GALF, then video decoder 30 categorizes each 2×2 block into one out of 25 classes based on the 2×2 block's directionality and quantized value of activity.

Another filtering technique that may be implemented by video encoder 20 and video decoder 30 is bilateral filtering. Bilateral filtering was formerly described by C. Tomasi and R. Manduchi, "Bilateral filtering for gray and color images," in Proc. of IEEE ICCV, Bombay, India, January 1998. Bilateral filtering was described to avoid undesirable oversmoothing for pixels at edges. The main idea of bilateral filtering is that the weighting of neighboring samples takes the pixel values themselves into account to give more weight to those pixels with similar luminance or chrominance values. A sample located at (i, j), may be filtered using its neighboring sample (k, l). The weight $\omega$(i, j, k, l) is the weight assigned for sample (k, l) to filter the sample (i, j), and it is defined as:

$$\omega(i, j, k, l) = e^{\left(-\frac{(i-k)^2+(j-l)^2}{2\sigma_d^2} - \frac{\|I(i,j)-I(k,l)\|^2}{2\sigma_r^2}\right)} \quad (1)$$

I(i, j) and I(k, l) are the intensity value of samples (i, j) and (k, l) respectively. $\sigma_d$ is the spatial parameter, and $\sigma_r$ is the range parameter. The filtering process with the filtered sample value denoted by $I_D$(i, j) could be defined as:

$$I_D(i, j) = \frac{\sum_{k,l} I(k, l) * \omega(i, j, k, l)}{\sum_{k,l} \omega(i, j, k, l)} \quad (2)$$

The properties (or strength) of the bilateral filter may be controlled by the spatial parameter and the range parameter. Samples located closer to the sample to be filtered and samples having smaller intensity difference relative to the sample to be filtered may have larger weight than samples further away and with larger intensity difference.

In Jacob Strom, Per Wennersten, Ying Wang, Kenneth Andersson, Jonatan Samuelsson, "Bilateral filter after inverse transform," JVET-D0069, 4th Meeting: Chengdu, CN, 15-21 Oct. 2016, each reconstructed sample in the transform unit (TU) is filtered using its direct neighboring reconstructed samples only.

Figure 4:
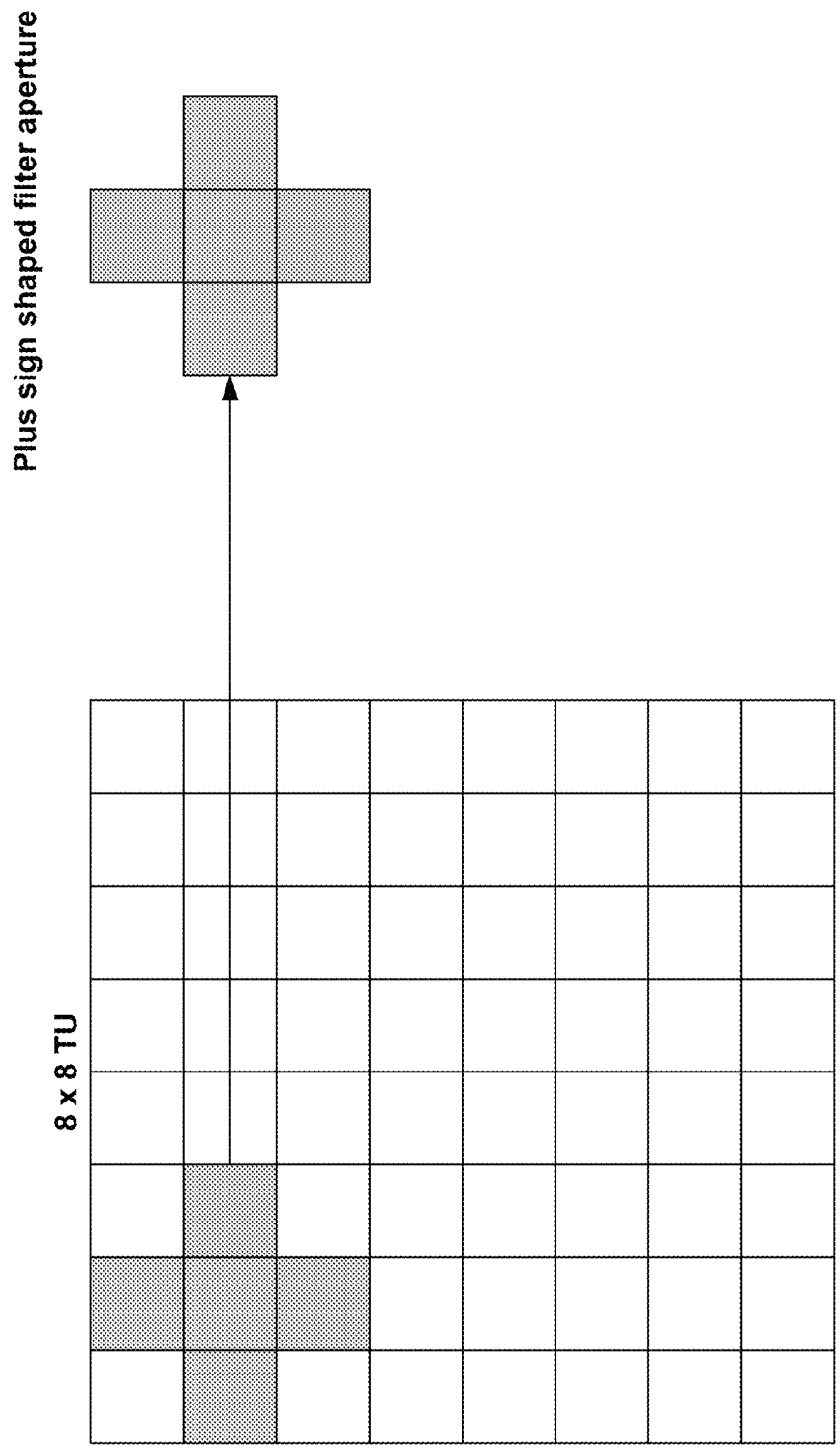
FIG. 4 shows an example of one sample and its neighboring four samples utilized in a bilateral filtering process.

FIG. 4 shows an example of one sample and the sample's neighboring four samples utilized in bilateral filtering process. The filter of FIG. 4 has a plus-sign-shaped filter aperture centered at the sample to be filtered. The value of $\sigma_d$ is set based on the transform unit size according to equation (3), and the value of $\sigma_r$ is set based on the QP used for the current block according to equation (4).

$$\sigma_d = 0.92 - \frac{\min(TU \text{ block width}, TU \text{ block height})}{40} \quad (3)$$

$$\sigma_r = \max\left(\frac{(QP - 17)}{2}, 0.01\right) \quad (4)$$

In J. Ström, P. Wennersten, K. Andersson, J. Enhorn, "Bilateral filter strength based on prediction mode," JVET-E0032, 5th Meeting: Geneva, CH, 12-20 Jan. 2017, to further reduce the coding loss under low delay configuration, the filter strength is further designed to be dependent on the coded mode. For intra-coded blocks, the above equation (3) is still used. For inter-coded blocks, the following equation is applied:

$$\sigma_d = 0.72 - \frac{\min(TU \text{ block width}, TU \text{ block height})}{40} \quad (5)$$

The different values for $\sigma_d$ means that filter strength for inter prediction blocks is relatively weaker compared to that of intra prediction blocks. Inter predicted blocks typically have less residual than intra predicted blocks and therefore the bilateral filter is designed to filter the reconstruction of inter predicted blocks less.

The output filtered sample value $I_D$(i, j) is calculated as:

$$I_F(i, j) = \frac{\sum_{k,l} I(k, l) * \omega(i, j, k, l)}{\sum_{k,l} \omega(i, j, k, l)} \quad (6)$$

Due to the fact that the filter only touches the sample and its 4-neighbours, this equation can be written as $$I_F = \frac{I_C \omega_C + I_L \omega_L + I_R \omega_R + I_A \omega_A + I_B \omega_B}{\omega_C + \omega_L + \omega_R + \omega_A + \omega_B} \quad (7)$$

where $I_C$ is the intensity of the center sample, and $I_L$, $I_R$, $I_A$ and $I_B$ are the intensities for the left, right, above and below samples, respectively. Likewise, $\omega_C$ the weight for the center sample, and $\omega_L$, $\omega_R$, $\omega_A$ and $\omega_B$ are the corresponding weights for the neighbouring samples. The filter only uses samples within the block for filtering; weights outside are set to 0.

In order to reduce the number of calculations, the bilateral filter in the JEM has been implemented using a look-up-table (LUT). For every QP, there is a one-dimensional LUT for the values $\omega_L$, $\omega_R$, $\omega_A$ and $\omega_B$ where the value $$\omega_{other} = \text{round}\left(65 * e^{\left(-\frac{1}{2*0.82^2} - \frac{\|I - I_C\|^2}{2\sigma_r^2}\right)}\right) \quad (8)$$

is stored, where $\sigma_r^2$ is calculated using equation (4) depending upon QP. Since $\sigma_d$=0.92−4/40=0.82 in the LUT, it can be used directly for the intra M×N with minimum(M, N) equal to 4 case with a center weight $\omega_C$ of 65, which represents 1.0. For the other modes (i.e., intra M×N but minimum (M, N) unequal to 4, inter K×L blocks), we use the same LUT, but instead use a center weight of $$\omega_C = \text{round}\left(65 * \frac{e^{-\frac{1}{2*0.82^2}}}{e^{-\frac{1}{2*\sigma_d^2}}}\right), \quad (9)$$

where $\sigma_d$ is obtained by (3) or (5). The final filtered value is calculated as $$I_F = \text{floor}\left(\frac{I_C\omega_C + I_L\omega_L + I_R\omega_R + I_A\omega_A + I_B\omega_B + ((\omega_C + \omega_L + \omega_R + \omega_A + \omega_B) >> 1)}{\omega_C + \omega_L + \omega_R + \omega_A + \omega_B}\right) \quad (10)$$

where the division used is integer division and the term $(\omega_C+\omega_L+\omega_R+\omega_A+\omega_B)>>1$ is added to get correct rounding.

In the JEM reference software, the division operation in Equation 2 is replaced by lookup table (LUT), multiplication and shift operations. To reduce the size of the numerator and denominator, Equation 2 is further refined to $$I_F = I_C + \frac{\omega_L(I_L - I_C) + \omega_R(I_R - I_C) + \omega_A(I_A - I_C) + \omega_B(I_B - I_C)}{\omega_C + \omega_L + \omega_R + \omega_A + \omega_B} \quad (11)$$

In the JEM reference software, Equation 11 is implemented in a way that the division could be implemented by two look-up tables, and (11) could be rewriten as:

$I_F=I_C+\text{sign}(\text{PixelDeltaSum})*((\text{sign}(\text{PixelDeltaSum})$
$\quad *\text{PixelDeltaSum}+o)*LUT(\text{sumWeights})>>(14+$
$\quad \text{DivShift}(\text{sumWeights}))) \quad (12)$ PixelDeltaSum=$(\omega_L(I_L-I_C)+\omega_A(I_A-I_C)+\omega_B(I_B-I_B-I_C)$ sumWeights=$\omega_C+\omega_L+\omega_R+\omega_A+\omega_B$ $o$=PixelDeltaSum+sign(PixelDeltaSum)

sign($x$)=$x>=0$?1: −1;

The two look-up tables are the look-up table LUT to get an approximated value for each 1/x (x is an positive integer value) after shifting, and a look-up table DivShift to define the additional shift value for input x. J. Strom, P. Wennersten, K. Andersson, J. Enhorn, "EE2-JVET related: Division-free bilateral filter," JVET-F0096, 6th Meeting: Hobart, CH, 31 Mar.-7 Apr. 2017, provides more details.

The bilateral filter is turned off if QP<18 or if the block is of inter type and the block dimensions are 16×16 or larger. It is noted that the proposed bilateral filtering method is only applied to luma blocks with at least one non-zero coefficient. In an example, for chroma blocks and luma blocks with all zero coefficients, the bilateral filtering method is always disabled.

Figure 5:
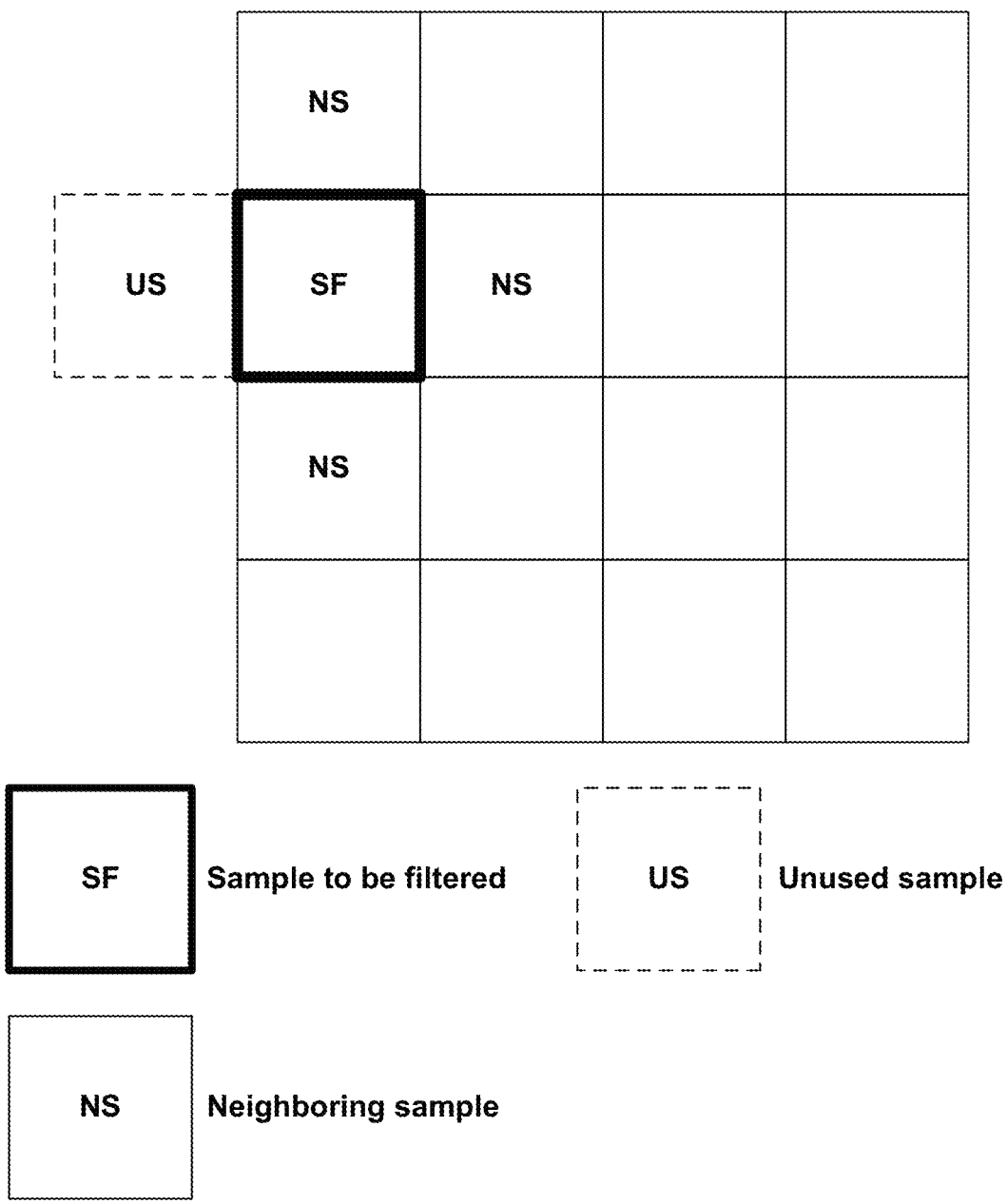
FIG. 5 shows an example of one sample and its neighboring four samples utilized in a bilateral filtering process.

FIG. 5 shows an example of one sample and its neighboring four samples utilized in bilateral filtering process. For samples located at a TU top and left boundaries (i.e., top row and left column), only neighboring samples within the current TU may be used to filter a current sample, as shown in the example of FIG. 5.

The design of bilateral filtering proposed in JVET-D0069, JVET-E0032, and JVET-F0096 may have several problems. As one example, even if the division is replaced by look-up tables, the calculation complexity is still relatively high which requires high-precision multiplications. As another example, the design of bilateral filter with fixed weighting parameters for all video sequences may not fully capture the characteristics of video content. This disclosure introduces techniques that may be implemented by video encoder 20 and video decoder 30 in order to solve these problems and others. The techniques of this disclosure may, thus, improve the functionality of video encoder 20 and video decoder 30 by reducing the complexity associated with the implementing bilateral filtering while still achieving the coding gains associated with bilateral filtering. Reducing the complexity associated with bilateral filtering may enable video encoder 20 and video decoder 30 to process video data more quickly, be implemented using less sophisticated hardware, achieve better battery life, and/or achieve other improvements.

To potentially solve the problems introduced above, this disclosure proposes a division-free bilateral filtering (DFBil) method. For one sample to be filtered, the DFBil filtering process can be defined as:

$$I_F = I_C + \sum_{i=1}^{N} w_i * (I_i - I_c)$$

where $I_C$ is the intensity of the current sample and $I_F$ is the modified intensity of the current sample after performing DFBil, $I_i$ and $w_i$ are the intensity and weighting parameter for the m-th neighboring sample, respectively.

Figure 6:
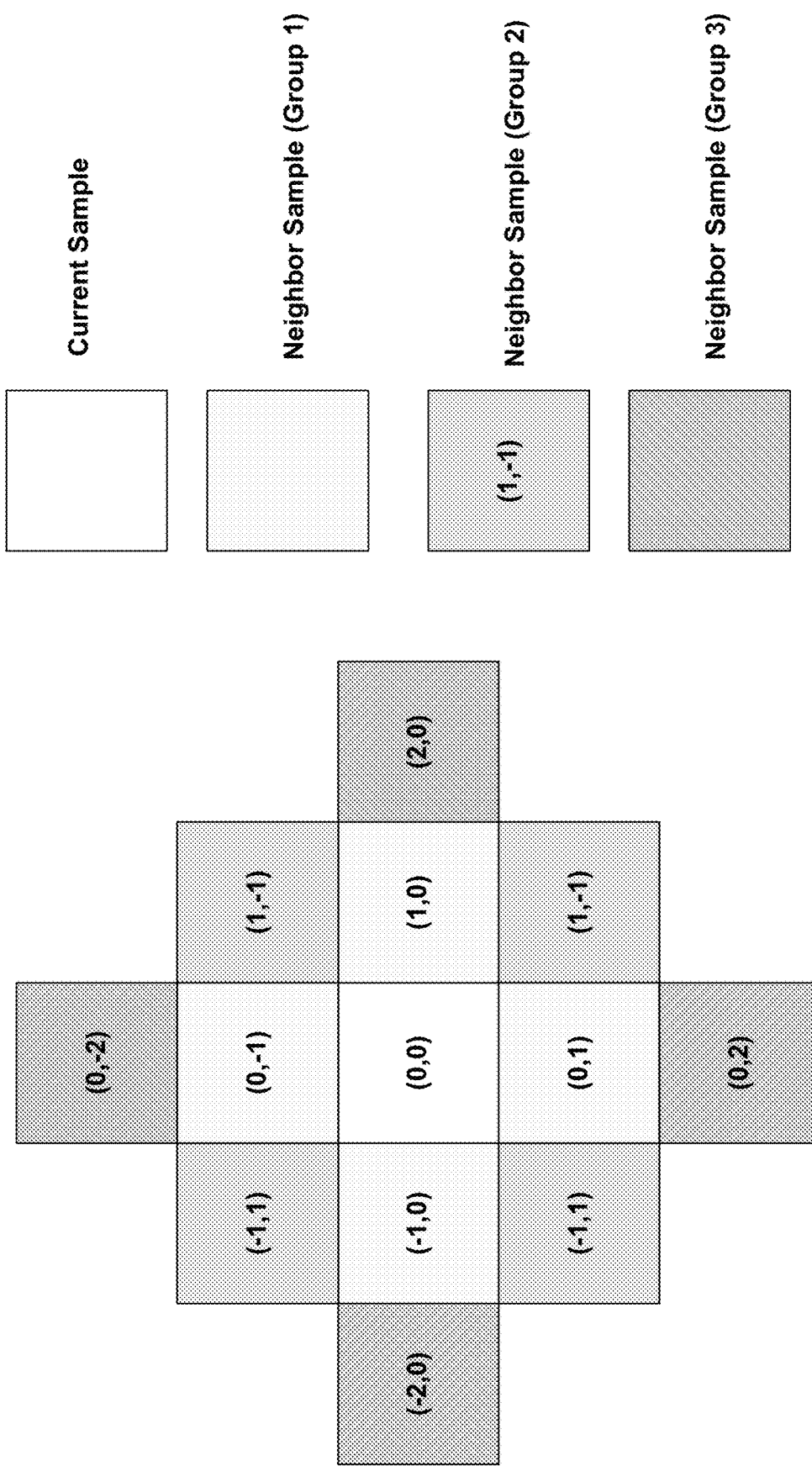
FIG. 6 shows an example of one sample and its neighboring samples utilized in a division-free bilateral (DFBil) filtering process.

According to one technique of this disclosure, video decoder 30 may implement bilateral filtering using neighboring samples located in a template. In one example, the template may include several neighboring samples which are spatially close to the current sample. An example of current sample and neighboring samples used in DFBil are depicted in FIG. 6. In one example, the template may include one or more neighboring samples which are from the co-located positions of previously coded frames or reference pictures. In one example, the template may include samples spatially close to a current sample and samples from co-located positions of previously coded pictures or reference pictures. In one example, the template may include samples spatially close to the current sample, samples from co-located positions of previously coded pictures or reference pictures, and samples spatially close to the samples at the co-located positions in other pictures. The template and/or total number of neighboring samples (N) may be pre-defined and fixed for all cases. Alternatively, the template and/or N may be signaled by an encoder, to be received by a decoder. Alternatively, the template and/or N may be adaptively changed per coded information, including but not limited to mode information and/or motion information.

According to another technique of this disclosure, the weighting factor $w_i$ may be represented by two parts, one part (denoted by $Dis_i$) to include the distance information between the current sample and one neighboring sample, and the other part (denoted by $Rang_i$) to include the sample difference information. In one example, $w_i=Dis_i*Rang_i$. $Rang_i$ may further rely on the quantization parameter (QP) of the block covering the current sample and/or based on local sample characteristics based on reconstructed samples and/or original samples (which may be signaled). In one example, the sample characteristics in a local area may be represented by, e.g., pixel variances, structure information, structural similarity index. The distance may be defined by a function of $f(x_i-x_c, y_i-y_c)$, such as $sqrt((x_i-x_c)^2+(y_i-y_c)^2)$ or $((x_i-x_c)^2+(y_i-y_c)^2)$, in which $(x_c, y_c)$ represents the coordinate of the current sample and $(x_i, y_i)$ represents the coordinate of the neighboring sample. $Dis_i$ may further rely on the coded mode information, transform information, motion information, and/or prediction directions.

In one example, for two samples located in intra and inter coded blocks, $Dis_i$ may be set to a smaller value for the inter-coded sample even when the i-th neighboring sample and current sample are the same or $Rang_i$ is the same. More than one candidate for $Rang_i$ may be allowed and one of the multiple candidates may be selected for one sample/block/partition to decide the real $Rang_i$. In one example, the candidate may indicate a QP difference. More than one candidate for $Dis_i$ may be allowed and one of the multiple candidates may be selected for one sample, block, or partition. In one example, the candidate may indicate a general weighting difference between a current sample and neighboring samples. $Dis_i$, or $Rang_i$, or $w_i$ may further vary depending on slice types, location of the block covering current sample relative to the top-left sample within the tile and/or slice, or position of the current sample relative to the top-left sample of the block covering the current sample, or whether the sample is located at the boundary of one block, or classified regions based on pixel variance. In one example, furthermore, the region for pixel variance calculation may be pre-defined or signaled in the bitstream by the encoder, for reception by the decoder. $Dis_i$, $Rang_i$, $w_i$ may be defined by look-up tables so that there is no need to calculate the parameters on-the-fly for each sample to be filtered.

According to another technique of this disclosure, video decoder 30 may invoke DFBil immediately after the deblocking filter process. DFBil may be invoked immediately after the reconstruction process of a block. DFBil may be applied to the prediction blocks after intra prediction or motion compensation. Or DFBil may be applied to the reference samples used for intra prediction. The order of DFBil and other in-loop filters may depend on the slice types of the video data. The order of DFBil and other in-loop filters may be pre-defined. Or the order could be adaptively changed and the adaptive order may be explicitly signaled or derived based on coded information.

According to another technique of this disclosure, video decoder 30 may receive the parameters (such as candidate index for $Dis_i$ and $Rang_i$ discussed above) required by DFBil per unit, such as in conjunction with LCU/CU/quadtree partitions. In one example, for each unit, DFBil may be enabled or disabled. That is, one additional bit to indicate the usage of DFBil may be further signaled by the encoder and received by the decoder. In one example, for each slice, one flag may be firstly signaled by the encoder and received by the decoder to indicate whether all blocks within the current slice are not to be filtered by DFBil.

In one example, similar to the quadtree structure employed in HEVC, the signaling of DFBil may also follow the quadtree design with some changes. One such changes is that the 'LCU' may be replaced by the whole slice and/or tile, i.e., the node of the quadtree structure is the whole slice and/or tile. Another potential change is that tor the first split, the region size may be defined as $(2^K, 2^K)$ wherein K is a positive integer and $2^K$ is smaller than the slice and/or tile width and $2^{K+1}$ is no smaller than the slice and/or tile width. For the remaining split, the region size is reduced by ¼, i.e., both height and width may be reduced by half. Another potential change is that the minimum size for signaling DFBil may be pre-defined, such as 64×64 or signaled in the bitstream.

In one example implementation, as defined above, the filtering process could be represented by:

$$I_F = I_C + \sum_{i=1}^{N} w_i * (I_i - I_c)$$

$$\omega_i = * Rang_i$$

$$Rang_i = e^{\left(-\frac{\|I_i - I_C\|^2}{2\sigma_r^2}\right)}$$

$$Dis_i = \frac{TempD_i}{1 + \sum_{j=1}^{N} TempD_j}$$

$$TempD_i = e^{\left(-\frac{10^4 * sqrt((i-k)^2 + (j-l)^2)}{2\sigma_d^2}\right)}$$

$$\sigma_r = (QP - minDFBilQP + 2 * Index_r - 2 * (RCandNum/2)) * 2$$

$$\sigma_d = DCandidateList[Index_d]$$

wherein minDFBilQP indicates the minimum QP for which DFBil is applied, e.g., it is set to 17. It should be noted that $Index_d$ and $Index_r$ may be signaled per CU, LCU, quad-tree partition, slice, or picture. RCandNum indicates the total number of candidates for $\sigma_r$ determination, and the array DCandidateList indicates the candidate list for $\sigma_d$ determination.

In one example, N is set to 12, RCandNum is set to 5. DCandidateList is set to [52, 62, 72, 82]. Alternatively, DCandidateList may be dependent on the slice type, or code mode. In one example, the list size is the same for all cases; alternatively, the list size may be different for different coded information.

Figure 7:
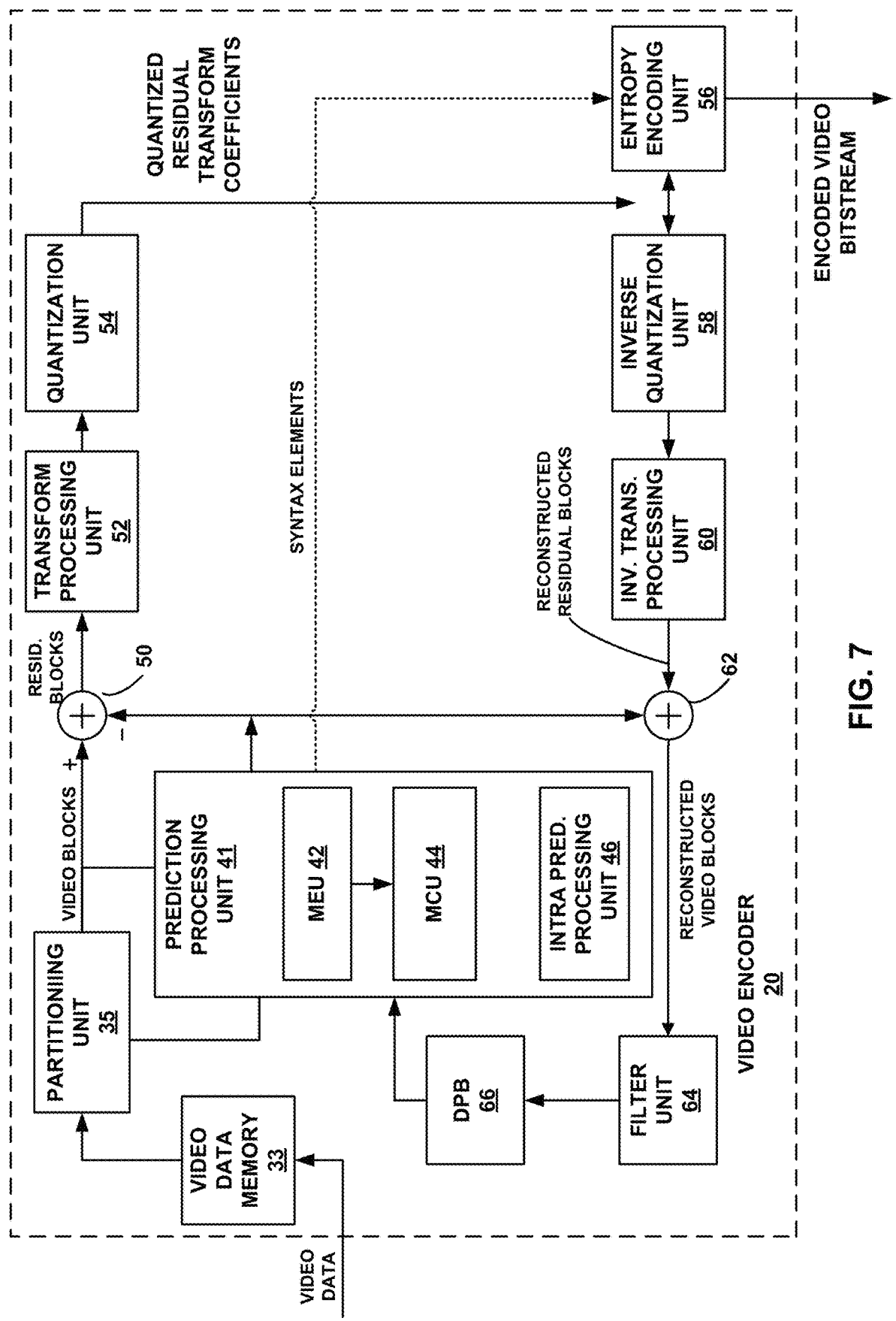
FIG. 7 is a block diagram illustrating an example video encoder that may implement the techniques described in this disclosure.

FIG. 7 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 7, video encoder 20 includes a video data memory 33, partitioning unit 35, prediction processing unit 41, summer 50, transform processing unit 52, quantization unit 54, and entropy encoding unit 56. Prediction processing unit 41 includes motion estimation unit (MEU) 42, motion compensation unit (MCU) 44, and intra prediction unit 46. For video block reconstruction, video encoder 20 also includes inverse quantization unit 58, inverse transform processing unit 60, summer 62, filter unit 64, and decoded picture buffer (DPB) 66.

As shown in FIG. 7, video encoder 20 receives video data and stores the received video data in video data memory 33. Video data memory 33 may store video data to be encoded by the components of video encoder 20. The video data stored in video data memory 33 may be obtained, for example, from video source 18. DPB 66 may be a reference picture memory that stores reference video data for use in encoding video data by video encoder 20, e.g., in intra- or inter-coding modes. Video data memory 33 and DPB 66 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 33 and DPB 66 may be provided by the same memory device or separate memory devices. In various examples, video data memory 33 may be on-chip with other components of video encoder 20, or off-chip relative to those components.

Partitioning unit 35 retrieves the video data from video data memory 33 and partitions the video data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 66. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in DPB 66. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

After prediction processing unit 41 generates the predictive block for the current video block, either via intra prediction or inter prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. In another example, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed block.

Filter unit 64 filters the reconstructed block (e.g. the output of summer 62) and stores the filtered reconstructed block in DPB 66 for uses as a reference block. The reference block may be used by motion estimation unit 42 and motion compensation unit 44 as a reference block to inter-predict a block in a subsequent video frame or picture. Filter unit 64 may, for example, implement the division-free bilateral filtering techniques described in this disclosure. Filter unit 64 may also perform any type of filtering such as deblock filtering, SAO filtering, peak SAO filtering, ALF, and/or GALF, and/or other types of loop filters. A deblock filter may, for example, apply deblocking filtering to filter block boundaries to remove blockiness artifacts from reconstructed video. A peak SAO filter may apply offsets to reconstructed pixel values in order to improve overall coding quality. Additional loop filters (in loop or post loop) may also be used.

Figure 8:
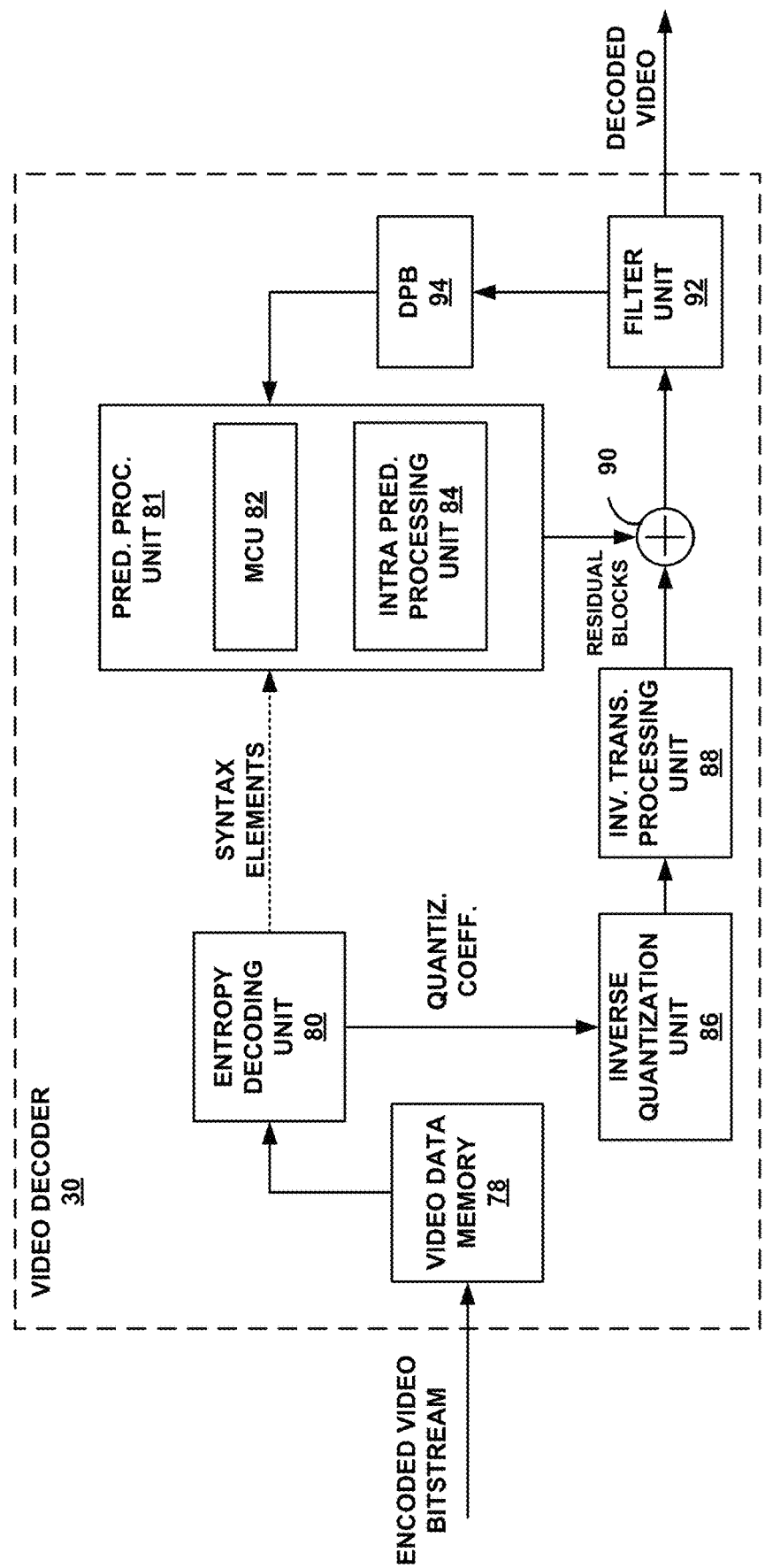
FIG. 8 is a block diagram illustrating an example video decoder that may implement the techniques described in this disclosure.

FIG. 8 is a block diagram illustrating an example video decoder 30 that may implement the techniques described in this disclosure. Video decoder 30 of FIG. 8 may, for example, be configured to receive the signaling described above with respect to video encoder 20 of FIG. 7. In the example of FIG. 8, video decoder 30 includes video data memory 78, entropy decoding unit 80, prediction processing unit 81, inverse quantization unit 86, inverse transform processing unit 88, summer 90, filter unit 92, and DPB 94. Prediction processing unit 81 includes motion compensation unit 82 and intra prediction unit 84. Video decoder 30 may, in some examples, perform a decoding pass generally reciprocal to the encoding pass described with respect to video encoder 20 from FIG. 7.

During the decoding process, video decoder 30 receives an encoded video bitstream that represents video blocks of an encoded video slice and associated syntax elements from video encoder 20. Video decoder 30 stores the received encoded video bitstream in video data memory 78. Video data memory 78 may store video data, such as an encoded video bitstream, to be decoded by the components of video decoder 30. The video data stored in video data memory 78 may be obtained, for example, via link 16, from storage device 26, or from a local video source, such as a camera, or by accessing physical data storage media. Video data memory 78 may form a coded picture buffer (CPB) that stores encoded video data from an encoded video bitstream. DPB 94 may be a reference picture memory that stores reference video data for use in decoding video data by video decoder 30, e.g., in intra- or inter-coding modes. Video data memory 78 and DPB 94 may be formed by any of a variety of memory devices, such as DRAM, SDRAM, MRAM, RRAM, or other types of memory devices. Video data memory 78 and DPB 94 may be provided by the same memory device or separate memory devices. In various examples, video data memory 78 may be on-chip with other components of video decoder 30, or off-chip relative to those components.

Entropy decoding unit 80 of video decoder 30 entropy decodes the video data stored in video data memory 78 to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction unit 84 of prediction processing unit 81 may generate prediction data for a video block of the current video slice based on a signaled intra prediction mode and data from previously decoded blocks of the current frame or picture. When the video frame is coded as an inter-coded slice (e.g., B slice or P slice), motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in DPB 94.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After prediction processing unit 81 generates the predictive block for the current video block using, for example, intra or inter prediction, video decoder 30 forms a reconstructed video block by summing the residual blocks from inverse transform processing unit 88 with the corresponding predictive blocks. Summer 90 represents the component or components that perform this summation operation.

Filter unit 92 filters the reconstructed block (e.g. the output of summer 90) and stores the filtered reconstructed block in DPB 94 for uses as a reference block. The reference block may be used by motion compensation unit 82 as a reference block to inter-predict a block in a subsequent video frame or picture. Filter unit 92 may, for example, implement the division-free bilateral filtering techniques described in this disclosure. Filter unit 92 may also perform any type of filtering such as deblock filtering, SAO filtering, SAO filtering, ALF, and/or GALF, bilateral filtering, and/or other types of loop filters. A deblock filter may, for example, apply deblocking filtering to filter block boundaries to remove blockiness artifacts from reconstructed video. An SAO filter may apply offsets to reconstructed pixel values in order to improve overall coding quality. Additional loop filters (in loop or post loop) may also be used.

The decoded video blocks in a given frame or picture are then stored in DPB 94, which stores reference pictures used for subsequent motion compensation. DPB 94 may be part of or separate from additional memory that stores decoded video for later presentation on a display device, such as display device 32 of FIG. 1.

Figure 9:
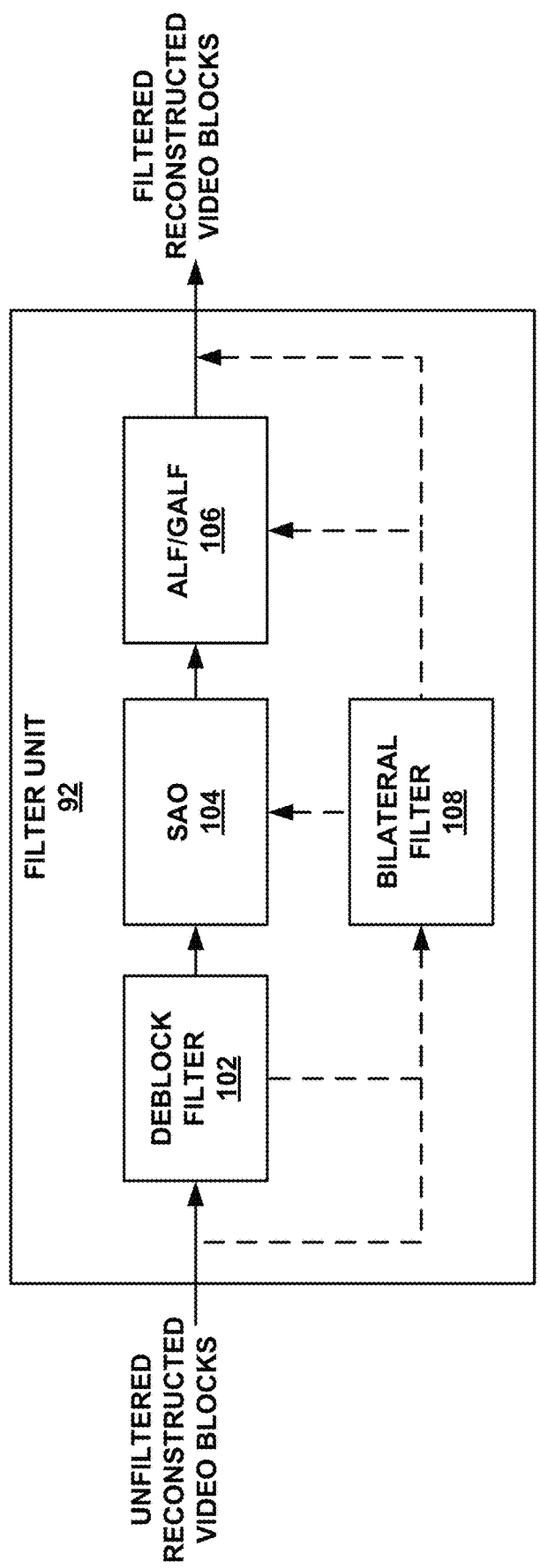
FIG. 9 shows an example implementation of a filter unit for performing the techniques of this disclosure.

FIG. 9 shows an example implementation of filter unit 92. Filter unit 64 may be implemented in the same manner. Filter units 64 and 92 may perform the techniques of this disclosure, possibly in conjunction with other components of video encoder 20 or video decoder 30. In the example of FIG. 9, filter unit 92 includes deblock filter 102, SAO filter 104, and ALF/GALF filter 106, as implemented in JEM 6. Filter unit 92 also includes bilateral filter 108. As shown in the example of FIG. 9, bilateral filter 108 may be used either separately from deblock filter 102, SAO filter 104, and/or ALF/GLAF filter 106, or in conjunction with deblock filter 102, SAO filter 104, and/or ALF/GLAF filter 106. In alternate implementations, filter unit 92 may include fewer filters and/or may include additional filters than those shown in FIG. 9. Additionally or alternatively, the particular filters shown in FIG. 9 may be implemented in a different order than shown in FIG. 9.

Figure 10:
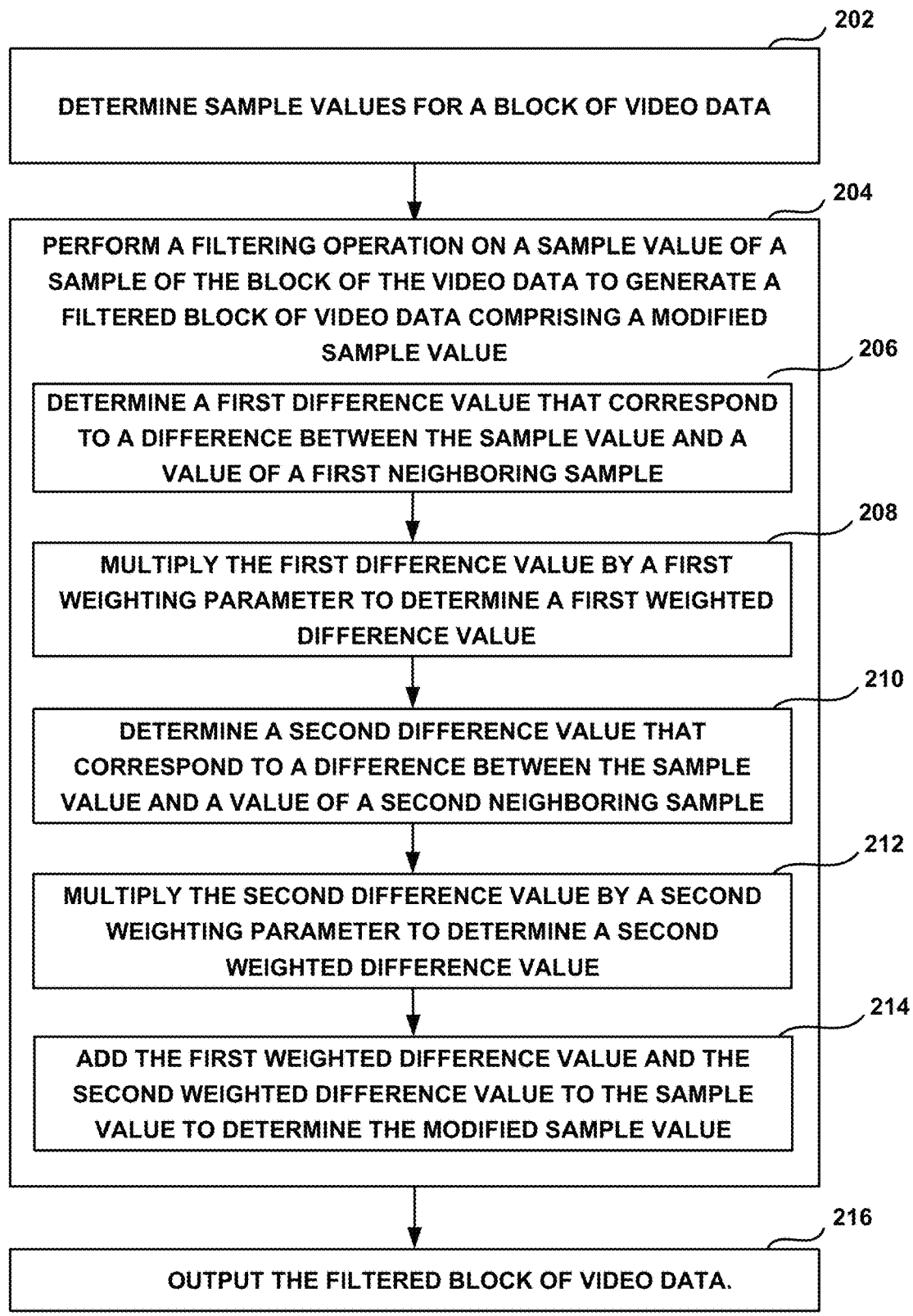
FIG. 10 is a flowchart illustrating an example operation of a video decoder, in accordance with a technique of this disclosure.

FIG. 10 is a flowchart illustrating an example operation of a video decoder for decoding video data in accordance with a technique of this disclosure. The video decoder described with respect to FIG. 10 may, for example, be a video decoder, such as video decoder 30, for outputting displayable decoded video or may be a video decoder implemented in a video encoder, such as the decoding loop of video encoder 20, which includes inverse quantization unit 58, inverse transform processing unit 60, filter unit 64, and DPB 66.

In accordance with the techniques of FIG. 10, the video decoder determines sample values for a block of video data (202). The video decoder performs a filtering operation on a sample value of a sample of the block of the video data to generate a filtered block of video data comprising a modified sample value (204). As part of performing the filtering operation, the video decoder determines a first difference value that corresponds to a difference between the sample value and a value of a first neighboring sample (206) and multiplies the first difference value by a first weighting parameter to determine a first weighted difference value (208). The video decoder also determines a second difference value that corresponds to a difference between the sample value and a value of a second neighboring sample (210), multiplies the second difference value by a second weighting parameter to determine a second weighted difference value (212), and adds the first weighted difference value and the second weighted difference value to the sample value to determine the modified sample value (214). The video decoder outputs the filtered block of video data, for example as part of a decoded picture that comprises the filtered block of video data. In some examples, the filtered block of video data may undergo additional filtering prior to being output.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    determining sample values for samples of a block of video data;
    performing a filtering operation on a sample value of a selected sample of the block of the video data to generate a filtered block of video data comprising a modified sample value, wherein performing the filtering operation comprises:
        determining a first difference value that corresponds to a difference between the sample value of the selected sample and a sample value of a first neighboring sample;
        determining a first weighting parameter based on a distance between the selected sample and the first neighboring sample, the first difference value, and a quantization parameter for the block of video data;
        multiplying the first difference value by the first weighting parameter to determine a first weighted difference value;
        determining a second difference value that corresponds to a difference between the sample value of the selected sample and a sample value of a second neighboring sample;
        multiplying the second difference value by a second weighting parameter to determine a second weighted difference value; and
        adding the first weighted difference value and the second weighted difference value to the sample value of the selected sample to determine the modified sample value; and
    outputting the filtered block of video data.

2. The method of claim 1, wherein performing the filtering operation comprises modifying the sample value of the selected sample according to the following equation:

$$I_F = I_C + \sum_{i=1}^{N} w_i * (I_i - I_c)$$

wherein $I_F$ is the modified sample value, $I_c$ is the sample value of the selected sample, $I_i$ is a sample value of an i-th neighboring sample, $w_i$ is a weighting parameter for the i-th neighboring sample, and N is a number of neighbor samples.

3. The method of claim 1, wherein the first neighboring sample comprises a sample that is immediately adjacent to the selected sample, and wherein the second neighboring sample comprise a sample that is not immediately adjacent to the selected sample.

4. The method of claim 1, wherein the first neighboring sample comprises a sample from a previously decoded picture.

5. The method of claim 1, wherein the block of video data comprises a post-deblock filtered, reconstructed block of video data.

6. The method of claim 1, wherein the method of decoding is performed as part of a decoding loop of a video encoding process, and wherein outputting the filtered block of video data comprises storing a reference picture comprising the filtered block of video data, the method further comprising:
    using the reference picture in encoding another picture of the video data.

7. The method of claim 1, wherein outputting a decoded picture comprises outputting the filtered block of video data to a display device.

8. A device for decoding video data, the method comprising:
    a memory configured to store the video data; and
    one or more processors configured to:
        determine sample values for samples of a block of the video data;
        perform a filtering operation on a sample value of a selected sample of the block of the video data to generate a filtered block of video data comprising a modified sample value, wherein to perform the filtering operation, the one or more processors are configured to:
            determine a first difference value that corresponds to a difference between the sample value of the selected sample and a sample value of a first neighboring sample;
            determine a first weighting parameter based on a distance between the selected sample and the first neighboring sample, the first difference value, and a quantization parameter for the block of video data;
            multiply the first difference value by the first weighting parameter to determine a first weighted difference value;
            determine a second difference value that corresponds to a difference between the sample value of the selected sample and a sample value of a second neighboring sample;
            multiply the second difference value by a second weighting parameter to determine a second weighted difference value; and
            add the first weighted difference value and the second weighted difference value to the sample value of the selected sample to determine the modified sample value; and
        output the filtered block of video data.

9. The device of claim 8, wherein to performing the filtering operation, the one or more processors are further configured to modify the sample value of the selected sample according to the following equation:

$$I_F = I_C + \sum_{i=1}^{N} w_i * (I_i - I_c)$$

wherein $I_F$ is the modified sample value, $I_c$ is the sample value of the selected sample, $I_i$ is a sample value of an i-th neighboring sample, $w_i$ is a weighting parameter for the i-th neighboring sample, and N is a number of neighbor samples.

10. The device of claim 8, wherein the first neighboring sample comprises a sample that is immediately adjacent to the selected sample, and wherein the second neighboring sample comprise a sample that is not immediately adjacent to the selected sample.

11. The device of claim 8, wherein the first neighboring sample comprises a sample from a previously decoded picture.

12. The method of claim 8, wherein the block of video data comprises a post-deblock filtered, reconstructed block of video data.

13. The device of claim 8, wherein the device is configured to decode the video data as part of a decoding loop of a video encoding process, and wherein to output the filtered block of video data, the one or more processors are configured to store a reference picture comprising the filtered block of video data, wherein the one or more processors are further configured to use the reference picture in encoding another picture of the video data.

14. The device of claim 8, wherein to output the filtered block of video data, the one or more processors are configured to output a decoded picture comprising the filtered block of video data to a display device.

15. The device of claim 8, wherein the device comprises a wireless communication device, further comprising a receiver configured to receive encoded video data.

16. The device of claim 15, wherein the wireless communication device comprises a telephone handset and wherein the receiver is configured to demodulate, according to a wireless communication standard, a signal comprising the encoded video data.

17. The device of claim 8, wherein the device comprises a wireless communication device, further comprising a transmitter configured to transmit encoded video data.

18. The device of claim 17, wherein the wireless communication device comprises a telephone handset and wherein the transmitter is configured to modulate, according to a wireless communication standard, a signal comprising the encoded video data.

19. A non-transitory computer-readable storage medium storing instructions that when executed by one or more processors cause the one or more processors to:
  determine sample values for samples of a block of video data;
  perform a filtering operation on a sample value of a selected sample of the block of the video data to generate a filtered block of video data comprising a modified sample value, wherein to perform the filtering operation, the instructions cause the one or more processors to:
    determine a first difference value that corresponds to a difference between the sample value of the selected sample and a sample value of a first neighboring sample;
    determine a first weighting parameter based on a distance between the selected sample and the first neighboring sample, the first difference value, and a quantization parameter for the block of video data;
    multiply the first difference value by the first weighting parameter to determine a first weighted difference value;
    determine a second difference value that corresponds to a difference between the sample value of the selected sample and a sample value of a second neighboring sample;
    multiply the second difference value by a second weighting parameter to determine a second weighted difference value; and
    add the first weighted difference value and the second weighted difference value to the sample value of the selected sample to determine the modified sample value; and
  output the filtered block of video data.

* * * * *